March 12, 1963
C. K. NELSON ET AL
3,080,884
DISTRIBUTOR VALVE
Filed Sept. 28, 1959
2 Sheets-Sheet 2
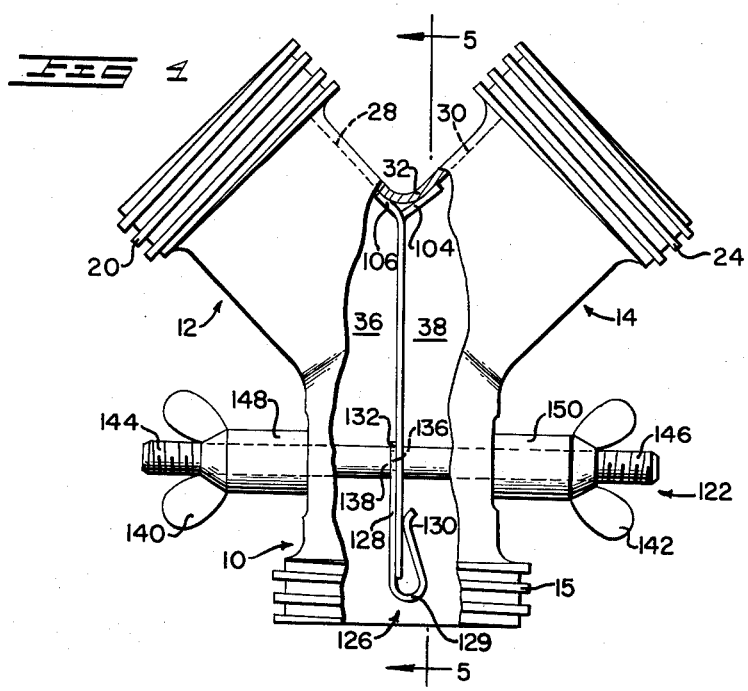
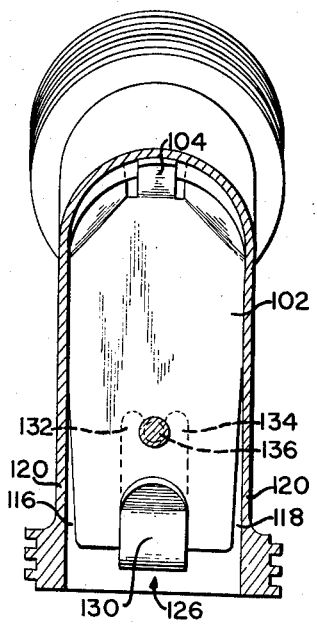
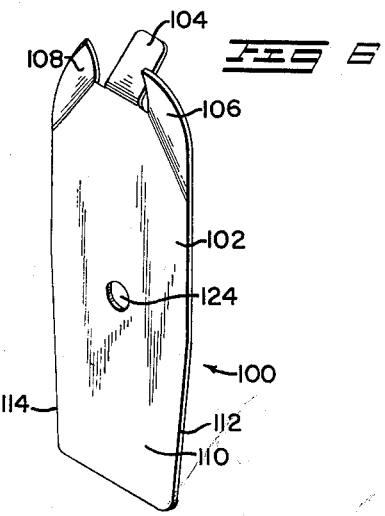
INVENTORS.
CHRISTIAN K. NELSON
CHARLES W. MELTON
THOMAS L. JERNIGAN
by their attorney
Robert B. Buckley 3,080,884
DISTRIBUTOR VALVE
Christian K. Nelson, Charles W. Melton, and Thomas L. Jernigan, all of Henrico County, Va., assignors to Eskimo Pie Corporation, Richmond, Va., a corporation of Delaware
Filed Sept. 28, 1959, Ser. No. 842,941
10 Claims. (Cl. 137—315)

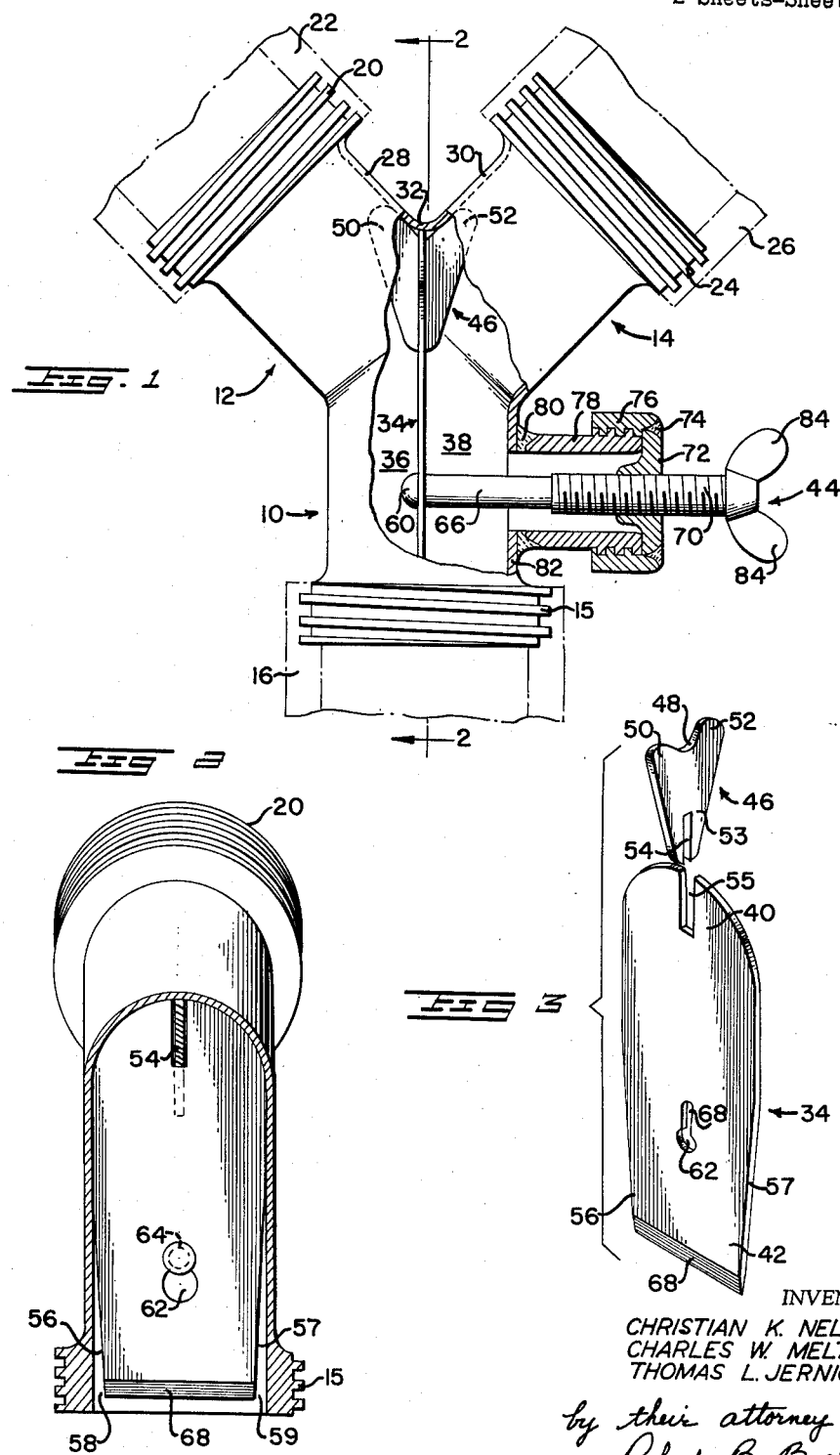

This invention relates to the flow of fluids. More particularly, the invention relates to valves for regulating the distribution of fluids in pipes.

In the extrusion of ice cream bars and rolls, it is necessary to divide the flow of ice cream from a freezing tank into a plurality of streams that individually are fed to extrusion nozzles. Changes in temperature and viscosity of the ice cream require that adjustments be made to maintain uniformity of product. The use of prior three-way valves caused a restriction of flow and a back pressure on the freezer tank resulting in a buttering of the ice cream that rendered the ice cream unsatisfactory for use. Such buttering of ice cream causes costly losses of material and time.

The present invention resides in the concept of a valve for distributing the flow of fluids, such as ice cream, from one passageway into a plurality of passageways without disruption of flow or the formation of undesirable back pressure.

The distributor valve of the invention is constructed so as to be adjusted to change the ratio of the flows between two branch pipes to the ratio required by product specifications and operating conditions.

Machinery for handling edibles must meet standards of cleanliness set down by health boards and health commissions of States and local municipalities. Apparatus having internal welds frequently have pits and cracks in the welds which collect dirt and are likely to cause the health board or commission to disapprove of machinery containing such internal welds. An advantage of the distributor valve of the invention is that it is constructed without internal welds and has smooth, clean internal surfaces.

For a better understanding of the invention and its other objects, advantages and details, reference is now made to the present preferred embodiments of the invention which are shown, for purposes of illustration only, in the accompanying drawings.

In the drawings:

FIG. 1 is an elevation partly broken away, of a distributor valve according to the invention;

FIG. 2 is a vertical section along the line 2—2 in FIG. 1;

FIG. 3 is an exploded view of the baffle and keeper employed in the distributor valve illustrated in FIGS. 1 and 2;

FIG. 4 is an elevation, partly broken away, of another distributor valve according to the invention;

FIG. 5 is a vertical section along the line 5—5 in FIG. 4; and,

FIG. 6 is a perspective of the baffle employed in the distributor valve shown in FIGS. 4 and 5.

Referring to FIGS. 1 to 3, there is illustrated a distributor valve including three circular pipes arranged in a Y-shape. The main or inlet pipe 10 and two branch or outlet pipes 12 and 14. The inlet pipe 10 is connected by square threads 15 to a hose 16 which leads from an ice cream freezer. The outlet pipe 12 is joined by square threads 20 to an outlet hose 22. Similarly, the outlet pipe 14 is joined by square threads 24 to an outlet hose 26. The outlet hoses 22 and 26 can lead to extrusion nozzles for forming ice cream bars.

The upper wall 28 of branch pipe 12 is joined to the upper wall 30 of branch pipe 14 at a juncture 32. The square threads employed form tight interlocking fits with a minimum of play, thus avoiding the collection of dirt or food particles which produce an unsanitary condition.

The ice cream flows inwardly from the hose 16 and is divided into the two branch pipes 12 and 14. The ratio of the rate of flow in the branch pipe 12 to the rate of flow in the branch pipe 14 is adjusted by the baffle plate 34 which extends along the inlet pipe 10 and divides the interior of the inlet pipe 10 into a sector 36 communicating with the interior of branch pipe 12 and a sector 38 communicating with branch pipe 14. The upper portion 40 of the baffle plate 34 has a curved shape to conform to the curved inner surface of juncture 32.

The baffle plate 34 pivots around a center of rotation at juncture 32 while the lower portion 42 of the baffle plate is moved back and forth across the interior of inlet pipe 10 by reciprocation of an operating rod 44. The baffle plate 34 is thus moved to a variety of positions where it is inclined to the vertical position shown in FIG. 1 so as to change the relative volumes of sectors 36 and 38 and thereby change the ratio of the rates of flow of ice cream through the sectors 36 and 38 and through the outlet pipes 12 and 14 with which they respectively communicate.

To maintain the upper portion 40 of the baffle plate located at the juncture 32 with a sanitary connection not requiring welding, a keeper 46 is provided including, as seen in FIG. 3, a central groove 48 formed in its upper surface, that engages juncture 32, a left arm 50 extending into left outlet pipe 12 and engaging the inner surface of wall 28, and a right arm 52 extending into the right outlet pipe 14 and engaging the inner surface of wall 30. The keeper 46 also includes a tapered lower portion 53 having a slot 54 formed therein for interlocking engagement with a slot 55 formed in the upper portion 40 of the baffle plate 34.

When the keeper 46 and baffle plate 34 are in interlocking engagement, as assembled in FIG. 1, the keeper 46 fits within the slot 55 in the baffle plate 34. Similarly, the baffle plate 34 fits within the slot 54 in keeper 46.

The lower baffle portion 42 has tapered edges 56 and 57 providing clearance spaces 58 and 59, as seen in FIG. 2, between the edges and the inner surface of inlet pipe 10 so that the baffle plate 34 can be pivoted to positions spaced on either side of the middle position shown in FIG. 1.

The operating rod 44 not only serves to pivot the baffle plate 34, but also functions to maintain the keeper 46 pressed against the juncture 32 and the inner surfaces of walls 28 and 30. To accomplish this, the operating rod 44 has a head 60 insertable through an enlarged hole 62 in the lower portion 42 of baffle plate 34. A diminished portion 64, indicated in dashed lines in FIG. 2, is formed by a groove between head 60 and stem 66 of the operating rod 44 and mates with the slot 68 in baffle plate 34 that communicates with enlarged hole 62. The head 60 is inserted through the hole 62 and then the rod 44 is moved upwardly, to the position seen in FIG. 1, to engage the diminished portion 64 in the slot 68 and form a releasable lock of the operating rod 44 with the baffle plate 34.

To provide adequate leverage in pivoting of baffle plate 34 and minimize any tendency of baffle plate 34 to flutter under heavy pressure, the operating rod engages the baffle plate 34 at a point spaced by a substantial distance from juncture 32.

The baffle plate 34 has its lower edge tapered to a sharp edge 68 for dividing the stream of ice cream into two branch streams with minimum turbulence.

To provide for reciprocation of the operating rod 44, the rod is provided with threaded shank 70 engaging internal threads on a nut plate 72 secured by a weld 74 to a nut ring 76 having internal square threads engaging external square threads on a tubular guide 78 secured by a weld 80 to the wall 82 of the inlet pipe 10. Wings 84 are provided on the outer end of threaded shank 70 for the manual rotation of operating rod 44 to effect the lateral movement thereof.

In operating the valve shown in FIGS. 1 to 3, ice cream is pumped through the hose 16 into the inlet pipe 10. The baffle plate 34 divides the main stream into two branch streams which pass through sectors 36 and 38 into outlet pipes 12 and 14, respectively. Whenever it is desired to change the ratio of the rates of flow of ice cream in the outlet pipes 12 and 14, the operating rod is rotated by manually turning wings 84. The rod 44 is moved laterally by engagement of the threaded shank 70 with the threaded nut plate 72. The lower portion 42 of baffle plate 34 is moved laterally as the baffle plate 34 pivots around the juncture 32.

The arms 50 and 52 can slide slightly over the inner surfaces of the walls 28 and 30 as the assemblage of the baffle plate 34 and the keeper 46 pivot. This pivoting of the baffle plate 34 is continued until the desired ratio of flows between the streams in outlet pipes 12 and 14 is achieved. The desired ratio can be determined by observing the output streams from extrusion nozzles (not shown) which can be connected to outlet pipes 12 and 14.

Another present preferred embodiment of the invention is illustrated in FIGS. 4 to 6. In this embodiment, parts similar to those shown in FIGS. 1 to 3 bear the same reference numerals. For the sake of brevity, these similar parts will not be re-described. This embodiment has a different construction of baffle plate and different means for moving the baffle plate to change the ratio of rates of flow of the streams in outlet pipes 12 and 14.

The baffle plate 100 as seen in FIGS. 4 and 6, includes a central portion 102 and, at its upper end, a finger 104 extending obliquely from the center of its upper end and slidably engaging the inner surface of wall 30 of outlet pipe 14. Also, a pair of side fingers 106 and 108 extend obliquely from the sides of the upper end of the baffle plate 100 and slidably engage the inner surface of wall 28 of outlet pipe 12. The engagement of fingers 104, 106 and 108 with the walls of the outlet pipes 12 and 14, maintains the upper end of the baffle plate at the juncture 32 when the lower portion of the baffle plate is moved, as subsequently described, to cause a pivoting of the baffle plate about the juncture 32 as an approximate center of rotation.

The lower portion 110 of baffle plate 100 has tapered edges 112 and 114 providing clearance spaces 116 and 118, as seen in FIG. 5, between the edges and the wall 120 of inlet pipe 10 so that the baffle plate 100 can be pivoted to positions spaced on either side of the middle position shown in FIG. 4.

An operating rod 122 pivots the baffle plate to change the ratio of the rates of flow in the outlet pipes 12 and 14. The rod extends through a circular hole 124 in baffle plate 100 aligned with registering diametral holes formed in the wall 120 of inlet pipe 10. A clip 126 transmits the motion of operating rod 122 to baffle plate 100. The clip 126 includes a base portion 128 abutting against one surface of baffle plate 100, a loop portion 129, and an end portion 130 resiliently abutting against the opposite surface of the baffle plate. A pair of legs 132 and 134 extend from the base portion 128 and have a snap fit over a diminished portion 136 formed at a groove in stem 138 of operating rod 122.

To move the operating rod 122 back and forth to change the division of flow in the inlet pipe 10, a pair of wing nuts 140 and 142 threadedly engage the threaded ends 144 and 146 of the operating rod. Spacers 148 and 150, which can be formed of resilient synthetic resin plastic, space the wing nuts 140 and 142, respectively, from the wall 120 of inlet pipe 10.

With ice cream flowing into inlet pipe 10 and being divided into two streams in sectors 36 and 38 and passing into outlet pipes 12 and 14, respectively, the ratio of the rates of flow is changed as follows. The wing nuts 140 and 142 are turned manually by the user so that the stem 138 moves along a diametral line across the interior of inlet pipe 10. The clip 126, is moved with the stem by the engagement of legs 132 and 134 in the groove formed at diminished portion 136. The clip 126, by its grasp on baffle plate 100, moves the baffle plate 100 sidewardly to pivot the baffle plate around an approximate center of rotation at juncture 32. Because the fingers 104, 106 and 108 are not connected to the walls 28 and 30, whatever sliding is necessary can readily occur as the baffle plate is pivoted to the position required to produce the desired ratio of rates of flow in the outlet pipes 12 and 14. With the baffle plate 100 in the desired position, the wing nuts 140 and 142 are turned to form tight engagement with the spacers 148 and 150.

Thus it will be seen that the invention provides a distributor valve for adjustably dividing the flow of fluid in a Y-valve and constructed with clean smooth surfaces to avoid collection of dirt.

While present preferred embodiments of the invention have been illustrated and described, it will be recognized that the invention can be otherwise embodied and practiced within the scope of the following claims.

We claim:

1. A distributor valve for regulating fluid flow comprising an inlet conduit; at least two outlet conduits communicating with said inlet conduit and joined to each other at a juncture; a baffle having one end pivotally positioned at the inner surface of the juncture of said outlet conduits and extending along the interior of said inlet conduit, positioning means movable integrally with said baffle, said positioning means slidably engaging the inner surfaces of both said outlet conduits on both sides of said juncture of said outlet conduits; an operating rod extending through the wall of said inlet conduit and into the interior of said inlet conduit, said operating rod operatively engaging said baffle at a point within said inlet conduit spaced a substantial distance from the juncture of said outlet conduits, said operating rod maintaining said positioning means in abutting relationship with said outlet conduits; and means for reciprocating said operating rod to pivot said baffle about said juncture of said outlet conduits to a variety of positions including two opposite extreme positions and intermediate positions between said extreme positions, said reciprocating means being constructed for firmly holding said baffle at any selected position.

2. A distributor valve for dividing a stream of frozen dessert into two substreams, said valve comprising a main conduit; two branch conduits communicating with said main conduit and joined to each other; a baffle plate having one end pivotally positioned on the inner surface of the juncture of said branch conduits, said baffle plate being separate from said conduits and extending from said juncture along the interior of said main conduit and dividing the interior of said main conduit into two sectors each communicating with a said branch conduit, said branch conduits forming an angle with each other less than 180 degrees; positioning means movable integrally with said baffle plate and including portions slidably engaging the inner surfaces of both said branch conduits on both sides of said juncture, said positioning means being separate from said conduits; operating means extending through the wall of said main conduit and into the interior of said main conduit, said operating means operatively engaging said baffle plate at a point spaced a substantial distance from said juncture of said branch conduits, said operating means, through its engagement with said baffle plate, maintaining said positioning means in touching engagement with said branch conduits; and means for reciprocating said operating means to pivot said baffle plate about said juncture to a variety of positions including two opposite extreme positions and intermediate positions between said extreme positions for changing the volume of said sectors and regulating the division of the frozen dessert stream within said valve, said reciprocating means being constructed for firmly holding said baffle plate at any selected position.

3. A valve comprising a main conduit; at least two branch conduits communicating with said main conduit and joined to each other; a baffle plate having one end pivotally positioned on the inner surface of the juncture of said branch conduits, said baffle plate being separate from said conduits and extending from said juncture along the interior of said main conduit and dividing the interior of said main conduit into two sectors each communicating with a said branch conduit, said baffle plate including a plurality of fingers integral therewith and extending therefrom, said fingers slidably engaging the inner surfaces of said branch conduits on both sides of said juncture, said fingers having smooth surfaces; operating means extending through the wall of said main conduit and into the interior of said main conduit, said operating means operatively engaging said baffle plate at a point spaced a substantial distance from said juncture of said branch conduits, said operating means maintaining said fingers in touch with said branch conduits; and, means for reciprocating said operating means to pivot said baffle plate about said juncture to a variety of positions including two opposite extreme positions and intermediate positions between said extreme positions, said reciprocating means being constructed for firmly holding said baffle plate at any selected position.

4. A valve comprising a main conduit; at least two branch conduits communicating with said main conduit and joined to each other; a baffle plate extending from the juncture of said branch conduits along the interior of said main conduit and dividing the interior of said main conduit into two sectors each communicating with a said branch conduit, said baffle plate having a slot formed in its end adjacent said juncture; a keeper plate having a body portion and arms extending from said body portion, said arms slidably engaging the inner surfaces of said branch conduits, said keeper plate body portion having a slot formed therein at the end thereof opposite said juncture, said keeper plate being inter-fitted with said baffle plate by said keeper plate being positioned within said slot in said baffle plate and said baffle plate being positioned within said slot in said keeper plate; operating means extending through the wall of said main conduit and into the interior of said main conduit, said operating means engaging said baffle plate to pivot said baffle plate and to maintain said keeper plate in abutting relationship with said branch conduits; and, means for reciprocating said operating means to pivot said baffle plate and keeper plate about said juncture of said outlet conduit to a variety of positions including two opposite extreme positions and intermediate positions between said extreme positions, said reciprocating means being constructed for firmly holding said baffle plate at any selected position.

5. A valve comprising a main conduit; two branch conduits communicating with said main conduit and joined to each other at a juncture, said main conduit being substantially circular in cross section; a baffle plate separate from said conduits and extending from said juncture along the interior of said main conduit and dividing the interior of said main conduit into two sectors each communicating with a said branch conduit; positioning means movable integrally with said baffle plate and including portions slidably engaging the inner surfaces of both said branch conduits on both sides of said juncture, said positioning portions being separate from said conduits; said baffle plate having a width substantially equal to the internal diameter of said main conduit at the end thereof adjacent said juncture, said baffle plate being tapered to a narrower width at the end thereof remote from said juncture, whereby pivoting of said plate within said substantially-circular main conduit is permitted; operating means extending through the wall of said main conduit and into the interior of said main conduit, said operating means engaging said baffle both to pivot said baffle and to maintain said positioning means in abutting relationship with said branch conduits; and, means for reciprocating said operating means to pivot said baffle about said juncture of said outlet conduit to a variety of positions including two opposite extreme positions and intermediate positions between said extreme positions, said reciprocating means being constructed for firmly holding said baffle plate at any selected position.

6. A valve comprising a main conduit; two branch conduits communicating with said main conduit and joined to each other at a juncture; a baffle plate extending from said juncture along the interior of said main conduit and dividing the interior of said main conduit into two sectors each communicating with a said branch conduit; a keeper plate having a body portion and arms extending from said body portion to slidably engage the inner surfaces of both said branch conduits, said keeper plate and said baffle plate being connected for pivoting integrally around said juncture; a tubular guide secured to the wall of said main conduit and extending substantially perpendicularly thereto, a closure plate closing the outer end of said tubular guide and having a threaded hole formed therein, a stem having a threaded shank threadedly received in said threaded hole in said closure plate, said baffle plate having an aperture formed therein, said stem having a portion received in said aperture in said baffle plate, said stem portion being releasably connected to said baffle plate, said threaded shank extending to the exterior of said closure plate, wings secured to the outer end of said stem for manual actuation of said stem to cause reciprocation of said stem and pivoting of said baffle plate and said keeper plate around said juncture.

7. A distributor valve for regulating fluid flow comprising an inlet conduit formed by a wall, said inlet conduit having a substantially circular cross-section; two outlet conduits connected with said inlet conduit and joined to each other at a juncture; a baffle having one end pivotally positioned at the inner surface of the juncture of said outlet conduits and extending along the interior of said inlet conduit, said baffle having a width substantially equal to the internal diameter of said substantially-circular inlet conduit at the end thereof adjacent said juncture; said baffle having its edges tapering to converge in the direction away from said juncture to provide a narrower width of said baffle at the end thereof farthest from said juncture, whereby clearance spaces are provided between the edges of said baffle at the end thereof remote from said juncture so that pivoting of said baffle within said inlet conduit is permitted; positioning means movable integrally with said baffle, said positioning means slidably engaging the inner surfaces of both said outlet conduits on both sides of said juncture; an operating rod extending through the wall of said inlet conduit and into the interior of said inlet conduit, said operating rod being connected to said baffle at a point within said inlet conduit spaced a substantial distance from the juncture, said operating rod maintaining said positioning means in abutting relationship with said outlet conduits, said inlet conduit surrounding the end of said baffle remote from said juncture whereby fluid material enters said inlet conduit with a direction of flow substantially parallel to the axis of said inlet conduit; and, means for reciprocating said operating rod to pivot said baffle about said juncture to a variety of positions including two opposite extreme positions and intermediate positions between said extreme positions, said reciprocating means being constructed for firmly holding said baffle in any selected position.

8. A valve comprising an inlet conduit formed by a wall, said inlet conduit being of substantially-circular cross section, said inlet conduit forming an axial flow path; two outlet conduits communicating with said inlet conduit and joined to each other at a juncture; a baffle having one end pivotally positioned at the inner surface of the juncture of said outlet conduits and extending along the interior of said inlet conduit, said baffle having a width substantially equal to the internal diameter of said substantially-circular inlet conduit at the end thereof adjacent said juncture, said baffle having its side edges tapered and converging toward the end of said baffle remote from said juncture, thereby providing a narrower width at said end remote from said juncture so that pivoting of said baffle within said substantially-circular inlet conduit can occur; positioning means movable integrally with said baffle, said positioning means slidably engaging the inner surfaces of both said outlet conduits on both sides of said juncture; an operating rod connected to said baffle at a position spaced a substantial distance from said juncture, said operating rod maintaining said positioning means in engagement with said surfaces of said branch conduits, said operating rod extending through said wall of said inlet conduit, said operating rod having a threaded portion outside the axial flow path of said substantially circular inlet conduit; at least one internally-threaded element threadedly engaging said operating rod at a position outside the axial flow path of said main conduit; means for producing relative rotation between said operating rod and said internally threaded element to move said operating rod and pivot said baffle about said juncture and change the ratio of flow rates of material into said outlet conduits, said rotation-producing means being constructed for holding firmly said baffle at any selected position.

9. A valve comprising a main conduit formed by a wall, said main conduit providing an axial flow path for material; two branch conduits communicating with said main conduit and joined to each other at a juncture; a baffle plate having one end pivotally positioned on the inner surface of said juncture, said baffle plate being separate from said conduits and extending from said juncture along the interior of said main conduit and dividing the interior of said main conduit into two sectors each communicating with a said branch conduit; positioning means movable integrally with said baffle plate and including portions slidably engaging the inner surfaces of both said branch conduits on both sides of said juncture; an operating rod connected to said baffle plate at a position spaced a substantial distance from said juncture, said operating rod maintaining said positioning means in engagement with said surfaces of said branch conduits, said operating rod extending through said wall of said main conduit, said operating rod having a portion thereof threaded outside the axial flow path of said main conduit; at least one internally-threaded element threadedly engaging said operating rod at a position outside the axial flow path of said main conduit; means for producing relative rotation between said operating rod and said internally-threaded element to produce lateral movement of said operating rod to pivot said baffle plate about said juncture for changing the volume of said sectors and changing the ratio of flow rates of material into said branch conduits.

10. A distributor valve for regulating fluid flow comprising an inlet conduit; two outlet conduits communicating with said inlet conduit and joined to each other at a juncture; a baffle plate having one end pivotally positioned at the inner surface of the juncture of said outlet conduits and extending along the interior of said inlet conduit, said baffle plate dividing the interior of said inlet conduit into two sectors each communicating with a said outlet conduit; said baffle plate including positioning means comprising a plurality of fingers extending therefrom, said fingers slidably engaging the inner surfaces of said outlet conduits on both sides of said juncture; an operating stem extending diametrally across said inlet conduit and through opposed holes in the wall of said inlet conduit, said baffle plate having an aperture formed therein, said aperture being located a substantial distance from the juncture of said outlet conduits, said stem extending through said aperture, said stem maintaining said positioning fingers in abutting relationship with said outlet conduits, a pair of nuts each threadedly engaging the opposite end portions of said stem externally of said main conduit; whereby said nuts can be rotated to reciprocate said stem and pivot said baffle plate about said juncture of said outlet conduits to a variety of positions including two opposite extreme positions and intermediate positions between said extreme positions and whereby said nuts can be tightened firmly to hold said baffle plate at any selected position.

References Cited in the file of this patent

UNITED STATES PATENTS

| | | |
|---|---|---|
| 106,867 | Pennock | Aug. 30, 1870 |
| 137,268 | Wetmore | Mar. 25, 1873 |
| 325,449 | Schueler | Sept. 1, 1885 |
| 1,621,022 | Merchen | Mar. 15, 1927 |

FOREIGN PATENTS

| | | |
|---|---|---|
| 524,190 | Great Britain | of 1940 |